March 9, 1965  R. FAVRE  3,173,036
TIME BASE, PREFERABLY FOR AN ELECTRIC TIME MEASURING DEVICE
Filed May 22, 1962  3 Sheets-Sheet 1

March 9, 1965   R. FAVRE   3,173,036
TIME BASE, PREFERABLY FOR AN ELECTRIC TIME MEASURING DEVICE
Filed May 22, 1962   3 Sheets-Sheet 2

March 9, 1965  R. FAVRE  3,173,036
TIME BASE, PREFERABLY FOR AN ELECTRIC TIME MEASURING DEVICE
Filed May 22, 1962  3 Sheets-Sheet 3

United States Patent Office 3,173,036
Patented Mar. 9, 1965

3,173,036
TIME BASE, PREFERABLY FOR AN ELECTRIC TIME MEASURING DEVICE
Robert Favre, Lausanne, Switzerland, assignor to Fabriques Movado, La Chaux-de-Fonds, Switzerland, a Swiss company
Filed May 22, 1962, Ser. No. 196,814
Claims priority, application Switzerland, May 24, 1961, 6,072/61
9 Claims. (Cl. 310—15)

The present invention refers to a time base, particularly for electric time-measuring devices, consisting of a mechanical oscillator as well as of an electromagnetic device driving this oscillator with at least one active element preferably a transistor, at least one control coil being inserted in the control circuit of the transistor and at least one driving coil in the output circuit of the transistor.

Time bases for watches are already known which operate with an oscillator consisting either of a balance or a tuning fork or a piezo-electric oscillator or a torsion oscillator. Torsion-oscillators operate with frequencies of 10 to 150 c.p.s. and thus comprise a medium frequency range lying between that of a balance and that of a piezo-electric oscillator.

The present invention using a torsion oscillator is characterized by the fact that the oscillator includes at least two permanent magnets, both outer magnetic fluxes of which are each closed over an armature part provided with an air gap, one sector of each of the above-mentioned driving or working coils lying in the respective air gap, the control coil being excited thorugh the flux of one of the permanent magnets and the driving coil acting on the other permanent magnet in such a way as to maintain the periodic oscillations.

Several embodiments of the time base according to the invention are shown on the drawings.

Figure 1:
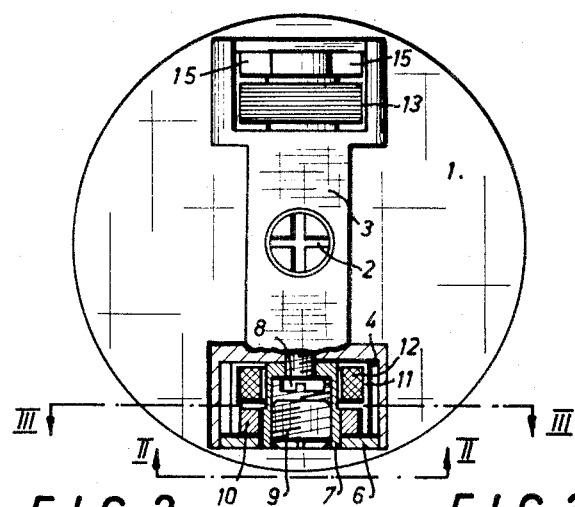
Figure 2:
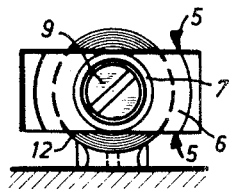
Figure 3:
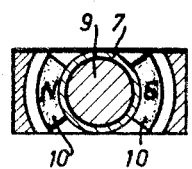
Figure 4:
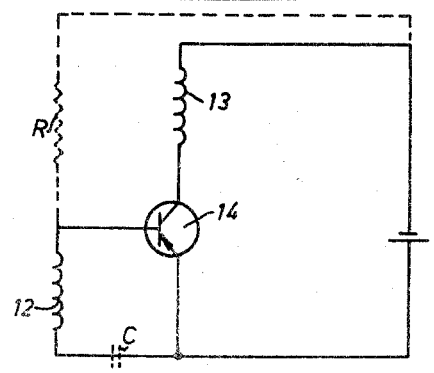
Figure 5:
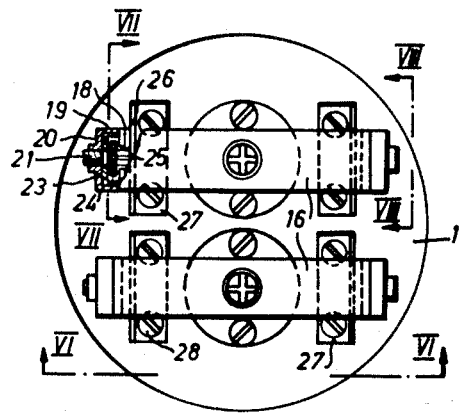
Figure 6:
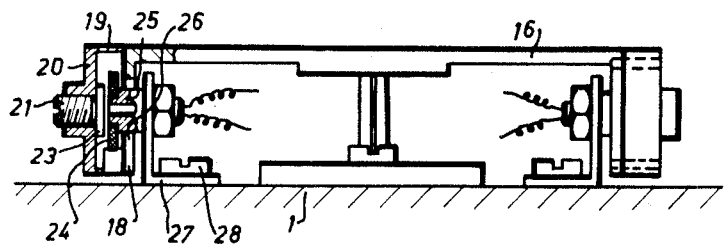
Figures 7, 8:
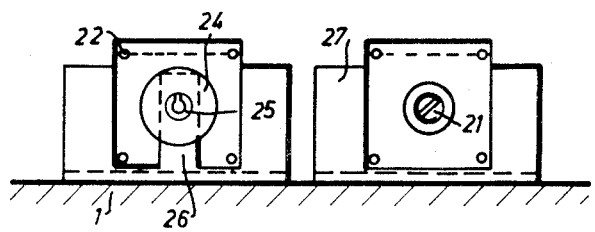
Figure 10:
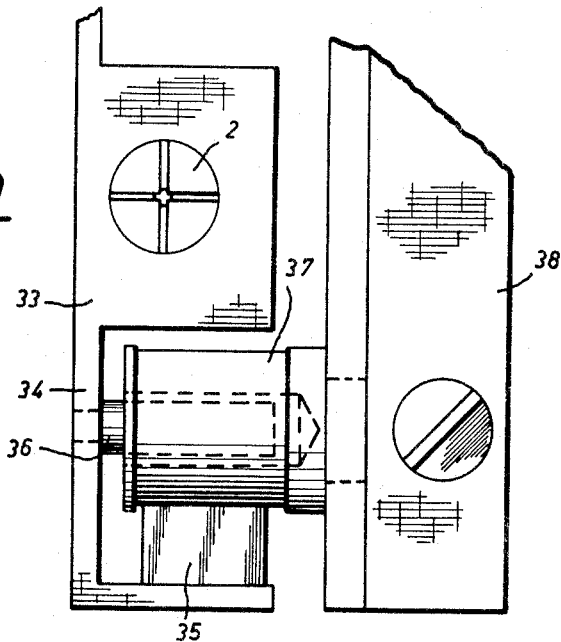
Figure 9:
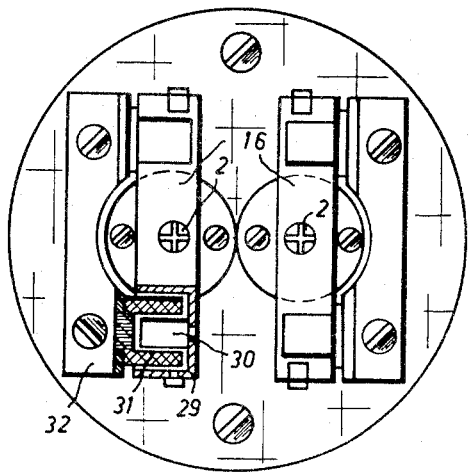

FIG. 1 is a top view of a first embodiment;
FIGS. 2 and 3 are cross-sections according to II—II and III—III of the embodiment as shown in FIG. 1;
FIG. 4 is a wiring diagram for the oscillation system according to the invention;
FIG. 5 is a top view of a second embodiment of the time base according to the invention;
FIG. 6 is a cross-section according to VI—VI;
FIGS. 7 and 8 are partial views of the embodiment according to FIGURE 5, VII—VII and VIII—VIII respectively;
FIG. 9 is a top view of a third embodiment of the time base according to the invention, and
FIG. 10 is a partial view of a fourth embodiment of the time base according to the invention.

According to FIGURE 1 there is a torsion spring 2 of a cross-shaped cross-section on the bottom plate 1 of a time piece on the upper end of which there is an oscillation arm 3. The characteristics of such torsion springs as well as the manner of fitting them are known and described in the Swiss patent application 66,450.

The oscillation arm 3 is provided at both ends with a head housing part of the electro-magnetic driving device for the oscillation system. Each of these heads is provided with an axial cavity 4 of a general cylindrical shape, both lateral surfaces 5 of which are segmented. The upper part of the cavity is closed by means of a yoke 6 provided with a central tube 7 extending into this cavity and at the bottom of which there is a screw 8 for fastening the yoke inside the cavity. Another screw 9 screwed into the said tube from outside permits regulating of the inertia moment and thus of the frequency of the time base.

On the inside wall of the yoke 6 there are two sector-shaped permanent magnets 10 arranged in such a way that their poles point in opposite directions.

In the cavity 4 enclosed by yoke 6 there is moreover a coil 12 which inside the circular cavity 11 has a sufficient clearance in relation to yoke 6 so as not to hinder the free swinging of arm 3 with its head. Coil 12 (FIGURE 2) is strongly connected to the bottom plate of the time base.

The outer magnetic circuit of the permanent magnet 10 is closed over this coil, over the yoke as well as over the walls formed by the head of the cavity 4.

The said coil 12 constitutes the control coil lying in the base emitter circuit of the transistor 14, as shown by the wiring diagram of FIGURE 4.

On the other side of arm 3 there is a head having exactly the same shape as the one described above and including in the same way a coil 13, a yoke and two permanent magnets 15. The coil 13 is the driving coil of the time base and lies in the collector ring of transistor 14 as shown in the diagram of FIGURE 4.

The currents induced through the oscillation of the permanent magnet 10 in the control coil 12 drive the transistor in the known manner so that the coil 13 is excited through the collector current of transistor 14 and acts periodically upon the two permanent magnets 15 which maintain the oscillations of the system. The poles of the two permanent magnets 15 point in opposite directions in relation to the permanent magnets 10 so that their action on the coil is cumulated.

FIGURE 5 shows a second embodiment of the time base according to the invention. According to this, there are two oscillation arms 16 on the bottom plate 1 of the time base which oscillate round the axes of their cross-shaped torsion springs, lie side by side and move at all times in opposite directions so that the system is in a dynamic equilibrium.

Each of the two heads of each arm consists of a plate 18, bending downwards in a right angle in relation to the arm. The rim 19 of a yoke 20 is fastened on plate 18. The middle part of this yoke is provided with a screw 21 for adjusting the frequency of the oscillation system as well as with four small pins 22 for fastening the yoke onto the plate.

At the bottom of the yoke there are two sector-shaped permanent magnets 23 the poles of which point in opposite directions and which co-operate with a coil 24 fitted inside the cylindrical space formed by the yoke and the plate. This coil is fastened with its middle part onto the end of a core 25 extending through a gap 26 in plate 18 and fastened at its other end by means of a screw 28 and an angle 27 onto the plate 1. This arrangement is a particularly simple embodiment and above all permits easy dismantling of the time base without having first to remove the coil. Moreover fastening of the coil itself is very simple.

FIGURE 9 shows another embodiment of the time base according to the invention. As in the case of the second embodiment there are two cross-shaped torsion springs 2 on a bottom plate of a time piece, one oscillation arm 16 being fitted onto each of their upper ends. The head 29 on each end of each oscillation arm points vertically upwards at the ends of the arms and encloses a cylindrical space the two lateral surfaces lying parallel to the oscillation plane of the arm being separated from the wall of this cylindrical space. The axis of this cylindrical cavity which is open on the side used by the other arm is perpendicularly to the longitudinal axis of the arm and parallel to the oscillation plane. In the centre of the wall of the head forming the bottom of the cylinder there is a permanent magnet 30 which extends into the cylindrical hollow space. From the opposite open side a coil 31 which is fastened by means of an angle 32 onto the bottom plate extends into the hollow space and encloses the said magnet 30. The circular gaps between the wall of the head 29 and the coil 31 on one hand as well as the inner side of the coil 31 and the magnet 30 are calculated in such a way that the magnet 30 may, when the arm is oscillating, delve into the coil without touching it and that the walls of the head 29 may glide over the coil, also without touching it. The wall of the head 29 forms at the same time the contact piece for the field of the permanent magnet.

Of the four heads and coils which are fitted at each end of the arms, two form the control and two the drive part of the time base.

On FIGURE 10 there is another embodiment of the head of an arm of the time base according to the invention. The head 34 of the arm 33 suspended on the torsion spring 2, which again encloses a hollow space, this time points vertically downwards at the end of the arm and carries, on one hand, a soft iron core 36 as well as a cylindrical permanent magnet 35. While the axis of the soft iron core 36 lies perpendicularly to the longitudinal axis of the arm and within the oscillation plane, the magnetic axis of the permanent magnet 35 which is fastened on the inner surface of the outer arm is perpendicular to the axis of the soft iron core. A coil 37 which is fastened to the bottom plate by means of an angle 38 encloses the soft iron core 36, one polar surface of the magnet 35 pointing to the outside of the coil 37 and having also a cylindrical shape adapted to the cylindrical coil shape, so that this polar surface and the outer coil surface are separated only by a very short space.

Again the gaps between the various elements are calculated in such a way that the soft iron core 36 may delve freely into the coil when the arm 33 is oscillating and that the permanent magnet 35 may shift freely along the outer surfaces of the coil. In order to generate the largest possible magnetic flux changes during oscillation, and thus the largest possible coil currents, the diameter of the magnet 35 should be considerably larger than the diameter of the iron core 36.

The invention is of course not limited to the embodiments of the proposed time base described in detail above and specialists may vary to a larger extent the arrangement and the shape of the head, the permanent magnets and the coils.

The arrangement of the heads and coils may for instance be such, on both sides of one of the oscillating arms, that they do not point in directions symmetrical in relation to a medium plane of the oscillating arm, as described in the last two embodiments but symmetrically in relation to the oscillating axis of the arm that is the oscillation of the head and coil at one end of the arm being turned at the other end of the arm by exactly 180°. This enables in a simple manner the center of gravity of the arm to fall exactly on its rotation axis.

I claim:

1. An oscillating system for an electrical time measuring device comprising, a mechanical oscillator capable of executing torsional oscillations, said mechanical oscillator comprising at least one arm, a torsion spring member having a longitudinal axis on which said arm is mounted normal thereto for oscillatory motion thereon about said axis of said torsion spring member, an electromagnetic device for oscillatably driving said arm comprising a control element, a control circuit and an output circuit connected to said control element, at least one control coil in the said control circuit, at least one operating coil in the said output circuit, at least two permanent magnets fixed to said arm axially spaced thereon, for each magnet an armature defining with each respective magnet two air-gaps, the armature being adapted to complete the external magnetic flux circuits of the permanent magnets, a portion of each of the said controlling and operating coils being located in one of the said air-gaps and another section in the other air gap, one of said magnets being disposed so that the magnetic flux excites said control coil, and said operating coil being disposed to impulse the other permanent magnet in operation to maintain periodic oscillations of said arm, a head at each end of the said arm, each of said heads having wall surfaces defining a recess in which a respective one of the permanent magnets are located, said walls defining said recesses comprising said armatures completing in operation the external flux circuits of said permanent magnets, said walls having openings for the passage of said coils into the recesses in the heads, and said recesses being dimensioned to allow the magnets to oscillate freely relatively to the coils in operation as said arm oscillates.

2. An oscillatory system according to claim 1, each of said recesses in said heads having substantially the configuration of a cylinder having an axis parallel to the longitudinal axis of the arm, at least one of the side walls defining each recess disposed parallel to the plane of oscillation of the arm being cut away and defining a cut-away in the recess, said system further comprising a base-plate, a mount fixed with the base-plate, a yoke closing the upper part of the recess, at least one permanent magnet secured to the bottom of the yoke, said yoke enclosing an annular space in which each of said coils co-operating with the magnets is arranged, part of each coil projecting out of the head through said cut-away, and said part of the coil being secured upon said mount connected with the base-plate.

3. An oscillatory system according to claim 2, in which said permanent magnet secured to the bottom of the yoke is sectorshaped.

4. An oscillatory system according to claim 1, further comprising a base-plate, a clockwork mechanism, said arm on the mechanical oscillator adapted to oscillate over the greater part of the surface area of the clockwork mechanism and parallel to this surface, each of said heads consisting of a plate fixedly connected with the arm and extending beneath said arm, a yoke, one edge of which abuts against said plate, at least one permanent magnet carried on a bottom of said yoke, the bottom of the yoke defining with said plate, a cylindrical cavity for a respective coil, and a core to which said respective coil is secured, the plate being formed with a gap through which this core projects, and the other end of this core being fixed to the base-plate.

5. An oscillatory system according to claim 1, further comprising an arm on the mechanical oscillator, said heads each having said walls shaped to surround a cylindrical space open at one side, the axis of said cylindrical space being perpendicular to the longitudinal axis of the arm and perpendicular to the axis of oscillation of the system, one side wall defining the cylindrical space, disposed parallel to the plane of oscillation of the arm having a cut away defining a cut-away from the surface of said space, and in which one of said permanent magnets comprises a permanent bar magnet arranged on the base surface of the cylindrical space and projecting into the cylindrical space, and said control coil comprising a stationary coil surrounding the permanent bar magnet and projecting into the cylindrical space in such a way that the walls of the magnet and the walls of the head can move freely relatively to the control coil during the oscillation of the arm.

6. An oscillatory system according to claim 1, in which said recess is open towards one side, a soft-iron core arranged in each head recess parallel to the axis of the arm, the axis of this soft-iron core being oriented perpendicularly to the axis of the arm and to the axis of oscillation of the system, said control coil comprising a stationary coil surrounding the core and projecting into the open side of the recess, one of said permanent magnets being arranged on a wall defining a recess and extending perpendicularly to the axis of the arm, the magnetic axis of said one permanent magnet being perpendicular to the axis of said stationary coil, one pole face of said one permanent magnet being adapted to the external form of the stationary coil, and facing at a short distance, the external surface of said stationary coil, and the soft-iron core and said one permanent magnet being freely movable relatively to said stationary coil during the oscillation of the arm.

7. An oscillatory system according to claim 6, in which diameter of the said one permanent magnet is substantially greater than that of said soft-iron core.

8. An oscillatory system according to claim 1, in which said heads are disposed at each end of said arm, said coils being at a respective end of the oscillating arm, the orientation of the head and of the coil at one end of the oscillating arm being disposed 180° relatively to the orientation of the head and of the coil at the other end of the oscillating arm, whereby said arm as a whole is symmetrical about its axis of oscillation.

9. An oscillatory system according to claim 1, in which the mechanical oscillator comprises another arm, located side by side and parallel with the first mentioned arm, another torsion spring member mounting said another arm for oscillation about a longitudinal axis thereof, each arm oscillating about a respective one of said torsion springs, and another control coil and another operating coil connected in said circuits for causing the oscillations of said arms at every instant in operation to be in opposite directions.

References Cited in the file of this patent

UNITED STATES PATENTS

| | | |
|---|---|---|
| 1,541,138 | Harje | June 9, 1925 |
| 2,900,786 | Hetzel | Aug. 25, 1959 |
| 2,971,104 | Holt | Feb. 7, 1961 |

FOREIGN PATENTS

| | | |
|---|---|---|
| 73,591 | France | Aug. 22, 1960 |

(Addition to No. 1,092,411)